(12) United States Patent
Komori et al.

(10) Patent No.: US 9,079,379 B2
(45) Date of Patent: Jul. 14, 2015

(54) REINFORCING METHOD AND REINFORCING STRUCTURE FOR STEEL STRUCTURE AND ELASTIC LAYER FORMING MATERIAL FOR REINFORCING STEEL STRUCTURE

(75) Inventors: Atsuya Komori, Tokyo (JP); Akira Kobayashi, Tokyo (JP); Yuya Hidekuma, Tokyo (JP); Kazuo Ohgaki, Tokyo (JP)

(73) Assignee: Nippon Steel & Sumikin Materials Co., Ltd., Tokyo (JP)

( * ) Notice: Subject to any disclaimer, the term of this patent is extended or adjusted under 35 U.S.C. 154(b) by 58 days.

(21) Appl. No.: 13/818,846

(22) PCT Filed: Aug. 29, 2011

(86) PCT No.: PCT/JP2011/070088
§ 371 (c)(1),
(2), (4) Date: Feb. 25, 2013

(87) PCT Pub. No.: WO2012/029966
PCT Pub. Date: Mar. 8, 2012

(65) Prior Publication Data
US 2013/0157060 A1    Jun. 20, 2013

(30) Foreign Application Priority Data

Aug. 31, 2010 (JP) ................................ 2010-195122

(51) Int. Cl.
*B32B 15/095* (2006.01)
*C08L 75/02* (2006.01)
(Continued)

(52) U.S. Cl.
CPC .............. *B32B 15/095* (2013.01); *B32B 38/08* (2013.01); *B62D 29/005* (2013.01); *C08G 18/10* (2013.01);
(Continued)

(58) Field of Classification Search
CPC ...... B23B 15/095; B23B 27/12; B23B 27/40; B23B 37/12; B23B 38/08; B23B 2250/04; B62D 29/005; C08G 18/10; C08G 18/3237; E04G 23/0218; C09J 163/00; C09J 175/02; C09J 133/08; E02B 3/06; C08L 75/02
USPC ........... 428/425.8, 423.7, 424.4, 414; 156/60, 156/330; 524/589
See application file for complete search history.

(56) References Cited

U.S. PATENT DOCUMENTS 6,737,134 B2 * 5/2004 Friedrich et al. ............. 428/36.3

FOREIGN PATENT DOCUMENTS

JP 63251213 A * 10/1988
JP 07-189426 A 7/1995
(Continued)

OTHER PUBLICATIONS

Int'l Search Report issued on Dec. 13, 2011 in Int'l Application No. PCTJP2011/070088.
(Continued)

Primary Examiner — Thao T Tran
(74) Attorney, Agent, or Firm — Panitch Schwarze Belisario & Nadel LLP

(57) ABSTRACT

A reinforcing method and structure for a steel structure and an elastic layer forming material for reinforcing a steel structure are provided that can prevent a reinforcing effect from being lowered by direct sunlight, can obtain a sufficient reinforcing effect, and can prevent a fiber sheet from being peeled away from a steel structure surface before the fiber sheet is torn. The reinforcing method for a steel structure, in which a fiber sheet including reinforcing fibers is bonded to a surface of the steel structure to integrate the fiber sheet with the steel structure, includes (a) a step of applying and hardening a polyurea resin putty to the surface of the steel structure to form an elastic layer, and (b) a step of bonding the fiber sheet to the surface of the steel structure having the elastic layer formed thereon with an adhesive agent.

4 Claims, 12 Drawing Sheets

(51) Int. Cl.
  *B32B 27/12* (2006.01)
  *B32B 27/40* (2006.01)
  *B32B 37/12* (2006.01)
  *C09J 163/00* (2006.01)
  *B62D 29/00* (2006.01)
  *E04G 23/02* (2006.01)
  *C08G 18/10* (2006.01)
  *C09J 175/02* (2006.01)
  *B32B 38/08* (2006.01)
  *E02B 3/06* (2006.01)

(52) U.S. Cl.
  CPC ............... *C08L 75/02* (2013.01); *C09J 163/00* (2013.01); *C09J 175/02* (2013.01); *E04G 23/0218* (2013.01); *E02B 3/06* (2013.01); *Y10T 156/10* (2015.01)

(56) References Cited

FOREIGN PATENT DOCUMENTS

| | | |
|---|---|---|
| JP | 11-140381 A | 5/1999 |
| JP | 2002-070327 A | 3/2002 |
| JP | 2004-197325 A | 7/2004 |
| JP | 3553865 B2 | 8/2004 |

OTHER PUBLICATIONS

Office Action issued Aug. 15, 2014 in CN Application No. 201180041784.7.

* cited by examiner

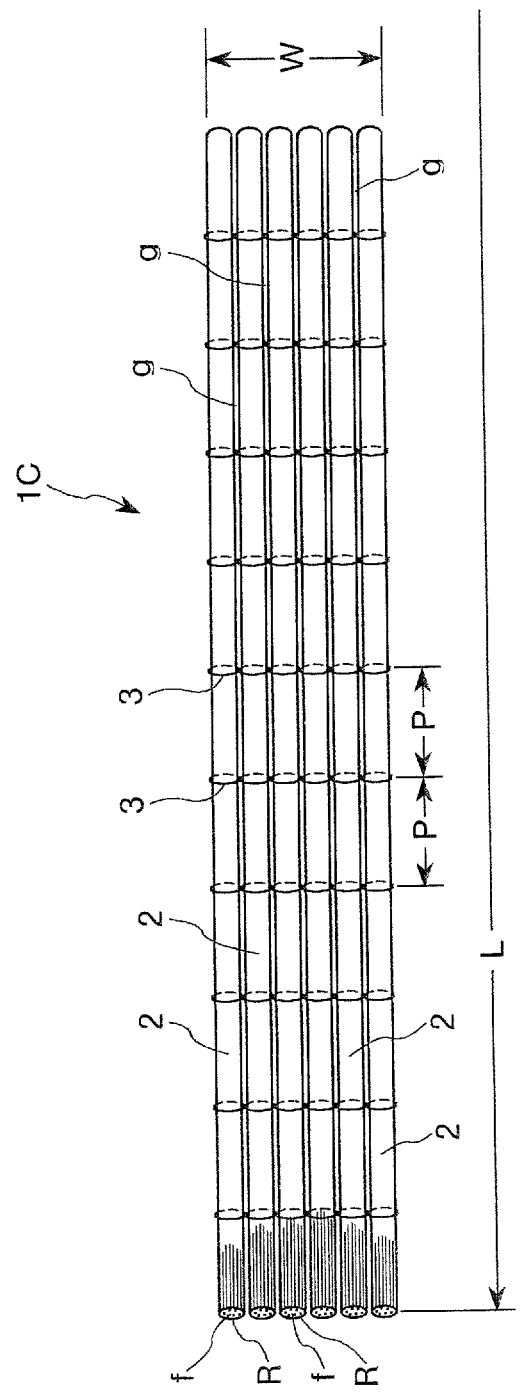

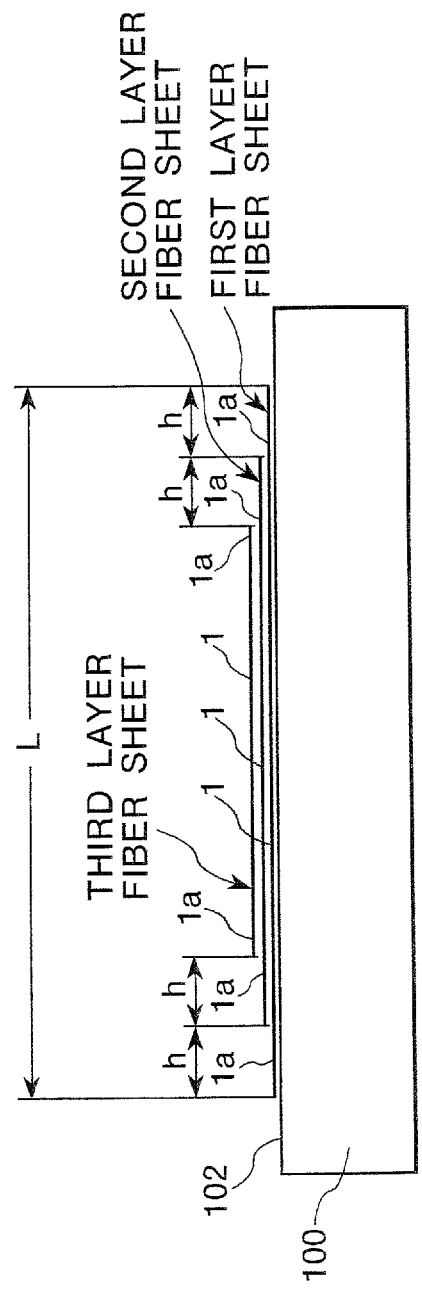

TEMPERATURE/LOAD CURVE BEFORE IMPROVEMENT

REINFORCING METHOD AND REINFORCING STRUCTURE FOR STEEL STRUCTURE AND ELASTIC LAYER FORMING MATERIAL FOR REINFORCING STEEL STRUCTURE

CROSS-REFERENCE TO RELATED APPLICATION

This application is a Section 371 of International Application No. PCT/JP2011/070088, filed Aug. 29, 2011, which was published in the Japanese language on Mar. 8, 2012, under International Publication No. WO 2012/029966 A1, and the disclosure of which is incorporated herein by reference.

TECHNICAL FIELD

The present invention relates a reinforcing method and a reinforcing structure for a steel structure and an elastic layer forming material for reinforcing a steel structure that repair and reinforce (to be simply referred to as "reinforce" hereinafter) steel structures of a bridge, a pier, a chimney, furthermore, a ship, a vehicle, and an aircraft by using a sheet-like reinforcing-fiber-containing material (to be referred to as a "fiber sheet" hereinafter) including continuous reinforcing fibers.

BACKGROUND ART

In recent years, as a reinforcing method for an existing or new steel structure, a continuous fiber sheet bonding method such as a carbon-fiber sheet bonding method or an aramid fiber sheet bonding method that attaches or winds a continuous reinforcing-fiber sheet such as a carbon fiber sheet or an aramid fiber sheet to the surface of the steel structure is given. A method in which a fiber sheet obtained by impregnating an unhardened matrix resin in continuous fiber bundles is bonded to adhere to a steel structure and then hardened is also given.

Furthermore, in order to omit the impregnation of a resin on site, an FRP plate bonding-reinforcing method in which a factory-produced FRP plate having a thickness of 1 to 2 mm and a width of about 5 cm is bonded to a steel structure by using a putty-like adhesive resin is also developed.

A steel structure reinforced by the above methods can obtain an enhanced reinforcing effect by a fiber sheet as long as the fiber sheet is integrally bonded to the steel structure. However, when the steel structure is deformed with a load, a desired object cannot be achieved when the fiber sheet is peeled away from the steel structure surface before the fiber sheet is broken.

Thus, Patent Document 1 discloses a method in which a buffer material layer is formed on the surface of a steel structure and, thereafter, a fiber sheet is bonded thereto with an adhesive agent to reinforce the steel structure. It is disclosed that, as the buffer material layer, a resin such as a thermosetting resin or a thermoplastic resin can be used. In addition, it is disclosed that a tensile elasticity modulus at 23° C. when the resin is singularly hardened is 0.1 to 50 N/mm$^2$.

PRIOR ART DOCUMENT

Patent Document

Patent Document 1: Japanese Patent Publication No. 3553865

SUMMARY OF THE INVENTION

Problem to be Solved by the Invention

However, as a result of an experimental research by the present inventors, it was newly found that a problem in which a fiber sheet is peeled away from a steel structure surface when the steel structure is reinforced, unlike in a case in which a concrete structure is reinforced with a fiber sheet, is considerably influenced by a temperature of the steel structure surface. Thus, when the steel structure is to be reinforced with a fiber sheet, the temperature of the steel structure surface must be sufficiently considered. The steel structure (steel product) has elongation caused by a change in temperature and deflection caused by vehicle traffic or the like that are larger than those of a concrete structure. For this reason, when a rigid continuous fiber sheet is bonded to the steel structure, it is concerned that the fiber sheet is peeled away from the structure at an end of the fiber sheet.

And also, it is known that a steel structure, for example, in this country, has a surface temperature that increases to a temperature of about 60° C. due to direct sunlight in midsummer. For this reason, when an adhesive agent or the like used in reinforcement by a fiber sheet according to a conventional specification is used, the adhesive agent is softened by the high surface temperature. In some case, it was found that a necessary reinforcing effect cannot be obtained.

In the reinforcing method according to Patent Document 1, a tensile elasticity modulus of a resin forming a buffer material layer is low. When the steel structure is reinforced with a rigid continuous fiber sheet or the like, the buffer material layer may not be able to transmit stress to be originally transmitted to the fiber sheet. More specifically, in this case, the fiber sheet is ineffective to make it impossible to reinforce the steel structure.

It is an object of the present invention to provide a reinforcing method and a reinforcing structure for a steel structure and an elastic layer forming material for reinforcing a steel structure in which, when a steel structure is reinforced with a fiber sheet, a reinforcing effect by the fiber sheet is prevented from being eliminated by sunlight irradiation or the like, a sufficient reinforcing effect can be obtained, and the fiber sheet is prevented from being peeled away from the steel structure surface before the fiber sheet is torn.

Means to Solve the Problem

According to the present invention, the object is achieved by the reinforcing method and the reinforcing structure for a steel structure and an elastic layer forming material for reinforcing a steel structure. In short, according to a first invention, there is provided a reinforcing method for a steel structure in which a fiber sheet containing reinforcing fibers is bonded to the surface of a steel structure to integrate the steel structure and the fiber sheet with each other and which comprises the steps of:

(a) applying a polyurea resin putty to a surface of the steel structure and hardening the polyurea resin putty to form an elastic layer; and (b) bonding the fiber sheet to the surface of the steel structure having the elastic layer formed thereon with an adhesive agent.

According to an embodiment of the first invention, the adhesive agent used in the step (b) has a glass transition temperature that is adjusted such that a reinforcing effect can be maintained even at a high temperature. For example, the adhesive agent has a glass transition temperature of 60° C. or more.

According to another embodiment of the first embodiment, a polyurea resin putty that forms the elastic layer in the step (a) contains a main resin, a hardening agent, a filler, and an additive agent and has a composition containing:

(i) the main resin: a prepolymer containing an isocyanate as a reactive component and having residual terminal isocyanate the NCO weight percent of which is adjusted to 1 to 16 parts by weight is used;

(ii) the hardening agent: a hardening agent containing an aromatic amine as a main component is used, an equivalence ratio of NCO serving as the main resin to an amine being given by 1.0:0.55 to 0.99 parts by weight;

(iii) the filler: a filler contains silica powders, a thixotropic agent, and the like, and is arbitrarily compounded at 1 to 500 parts by weight; and (iv) the additive agent: an additive agent contains a coloring agent, a viscosity modifier, an elasticizer, and the like, and is arbitrarily compounded at 1 to 50 parts by weight.

According to another embodiment of the first invention, the adhesive agent used in the step (b) is a room-temperature-setting epoxy resin, an epoxy acrylate resin, an acrylic resin, an MMA resin, a vinylester resin, an unsaturated polyester resin, or a UV curable resin. Preferably, the adhesive agent is an epoxy resin adhesive agent. The epoxy resin adhesive agent is provided by two components including a main resin and a hardening agent, and has a composition containing:

(i) the main agent: a main resin containing an epoxy resin as a main component and a silane coupling agent or the like serving as an adhesion enhancing agent as needed is used; and (ii) the hardening agent: a hardening agent contains amines as main components, an equivalence ratio of an epoxy resin serving as the main resin to amines of the hardening agent being 1:1.

According to still another embodiment of the first invention, prior to forming the elastic layer on the surface of the steel structure, the method includes the step of performing surface preparation to the surface of the steel structure and/or the step of applying a primer.

According to still another embodiment of the first invention, the fiber sheet is a fiber sheet in which continuous reinforcing fibers arranged in one direction are fixed with a strands fixing member. The fiber sheet is a fiber sheet in which a plurality of continuous fiber-reinforced plastic strands each formed by impregnating the matrix resin in the reinforcing fibers and hardening the resin, are arranged in the longitudinal direction in the form of a blind and fixed to each other with a strand fixing member. Alternatively, the fiber sheet is a fiber sheet in which a resin is impregnated in continuous reinforcing fiber sheets arranged in one direction and is hardened.

According to still another embodiment of the first invention, the fiber sheets are laminated as a plurality of layers on the surface of the steel structure and integrated with the steel structure.

According to a second invention, in the reinforcing method for a steel structure described above, there is provided an elastic layer forming material for reinforcing a steel structure configured by a polyurea resin putty for forming the elastic layer. The polyurea resin putty contains a main resin, a hardening agent, a filler, and an additive agent, and is characterized by including a composition containing:

(i) the main resin: a prepolymer containing isocyanate as a reactive component and having residual terminal isocyanate the NCO weight percent of which is adjusted to 1 to 16 parts by weight is used;

(ii) the hardening agent: a hardening agent containing an aromatic amine as a main component is used, an equivalence ratio of NCO serving as the main resin to an amine being given by 1.0:0.55 to 0.99 parts by weight;

(iii) the filler: a filler contains silica powders, a thixotropic agent, and the like, the components being arbitrarily combined with each other at 1 to 500 parts by weight; and (iv) the additive agent: an additive agent contains a coloring agent, a viscosity modifier, an elasticizer, and the like, the components being arbitrarily combined with each other at 1 to 50 parts by weight. The polyurea resin putty has a tensile elongation of 400% or more in hardening, a tensile strength of 8 N/mm$^2$ or more, and a tensile elastic modulus of 60 N/mm$^2$ or more and 500 N/mm$^2$ or less.

According to a third invention, there is provided a reinforcing structure for a steel structure characterized by including:

(a) an elastic layer formed by applying a polyurea resin putty on a surface of the steel structure; and (b) a fiber sheet layer bonded to the surface of the steel structure having the elastic layer formed thereon with an adhesive agent and impregnated with a resin.

According to one embodiment of the third invention, the elastic layer has a tensile elongation of 400% or more in hardening, a tensile strength of 8 N/mm$^2$ or more, and a tensile elasticity modulus of 60 N/mm$^2$ or more and 500 N/mm$^2$ or less.

According to another embodiment of the third invention, the adhesive agent has a glass transition temperature that is adjusted such that a reinforcing effect can also be maintained even at a high temperature. For example, the adhesive agent has a glass transition temperature of 60° C. or more.

In the third invention, preferably, the polyurea resin putty contains a main resin, a hardening agent, a filler, and an additive agent, and has a composition containing:

(i) the main resin: a prepolymer containing isocyanate as a reactive component and having residual terminal isocyanate the NCO weight percent of which is adjusted to 1 to 16 parts by weight is used;

(ii) the hardening agent: a hardening agent containing an aromatic amine as a main component is used, an equivalence ratio of NCO serving as the main resin to an amine being given by 1.0:0.55 to 0.99 parts by weight;

(iii) the filler: a filler contains silica powders, a thixotropic agent, and the like, the components being arbitrarily combined with each other at 1 to 500 parts by weight; and (iv) the additive agent: an additive agent contains a coloring agent, a viscosity modifier, an elasticizer, and the like, the components being arbitrarily combined with each other at 1 to 50 parts by weight. As the adhesive agent, a room-temperature-setting epoxy resin, an epoxy acrylate resin, an acrylic resin, an MMA resin, a vinylester resin, an unsaturated polyester resin, or a UV curable resin is used. Preferably, the adhesive agent is an epoxy resin adhesive agent. The epoxy resin adhesive agent is provided by two components including a main resin and a hardening agent, and has a component containing:

(i) the main resin: a main resin containing an epoxy resin as a main component and a silane coupling agent or the like serving as an adhesion enhancing agent as needed is used; and (ii) the hardening agent: a hardening agent contains amines as main components, an equivalence ratio of an epoxy resin serving as the main resin to amines of the hardening agent being 1:1.

Effect of the Invention

According to a reinforcing method and a reinforcing structure for a steel structure and an elastic layer forming material for reinforcing a steel structure, a reinforcing effect by the fiber sheet is prevented from being eliminated by sunlight irradiation or the like, a sufficient reinforcing effect can be obtained, and the fiber sheet is prevented from being peeled away from the steel structure surface before the fiber sheet is broken.

BRIEF DESCRIPTION OF THE DRAWINGS

FIG. 4 is a perspective view showing an embodiment of the fiber sheet that can be used in the reinforcing method for a steel structure according to the present invention.

FIG. 8 illustrates working steps for explaining another embodiment of the reinforcing method for a steel structure according to the present invention.

EMBODIMENT FOR CARRYING OUT THE INVENTION

A reinforcing method and a reinforcing structure for a steel structure and an elastic layer forming material for reinforcing a steel structure according to the present invention will be described in more detail with reference to the accompanying drawings.

Figure 1:
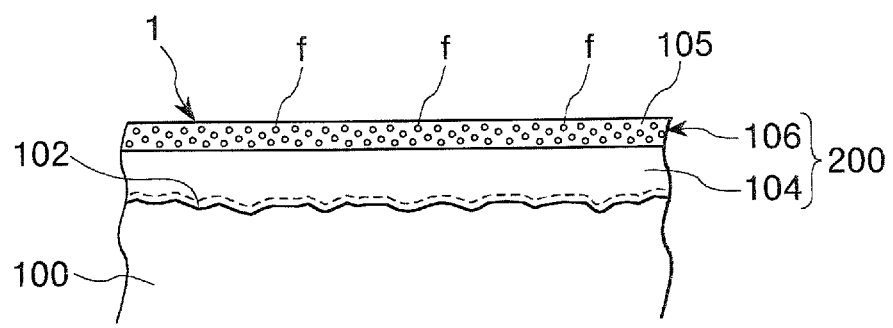
FIG. 1 is a sectional view of an example of a reinforced steel structure to explain a reinforcing method and a reinforcing structure for a steel structure according to the present invention.

Referring to FIG. 1, according to the reinforcing method for a steel structure according to the present invention, a fiber sheet 1 containing continuous reinforcing fibers f is bonded to the surface of a steel structure 100 through an elastic layer 104 to integrate the steel structure 100 and the fiber sheet 1 with each other.

The characteristics of the reinforcing method for a steel structure according to the present invention resides in the construction comprising the steps of:

(a) applying a polyurea resin putty to the surface 102 of the steel structure 100 and harden the polyurea resin putty to form the elastic layer 104 as a buffer layer; and (b) bonding the fiber sheet 1 to the surface of the steel structure 100 having the elastic layer 104 formed thereon by using an adhesive agent 105 the glass transition temperature of which is adjusted to 60° C. or more as needed.

More specifically, according to the present invention, there is provided a reinforcing structure for a steel structure characterized by including:

(a) an elastic layer 104 formed by applying a polyurea resin putty on the surface 102 of the steel structure 100; and (b) a fiber sheet layer 106 bonded to the surface 102 of the steel structure 100 having the elastic layer 104 formed thereon with the adhesive agent 105 and impregnated with a resin. The elastic layer 104 has a tensile elongation of 400% or more in hardening, a tensile strength of 8 N/mm$^2$ or more, and a tensile elastic modulus of 60 N/mm$^2$ or more and 500 N/mm$^2$ or less.

According to the present invention, preferably, before the elastic layer 104 is formed on the surface of the steel structure 100, surface preparation can be performed to the surface 102 of the steel structure 1. Furthermore, a primer is applied to the steel structure surface 102.

Materials used in the present invention will be described below.

(Fiber Sheet)

In the present invention, the fiber sheets 1 in various forms can be used. An example of the fiber sheet 1 is concretely explained as Concrete Examples 1 to 3. The forms of the fiber sheets 1 used in the present invention are not limited to the fiber sheets of the concrete examples.

Concrete Example 1

Figure 2:
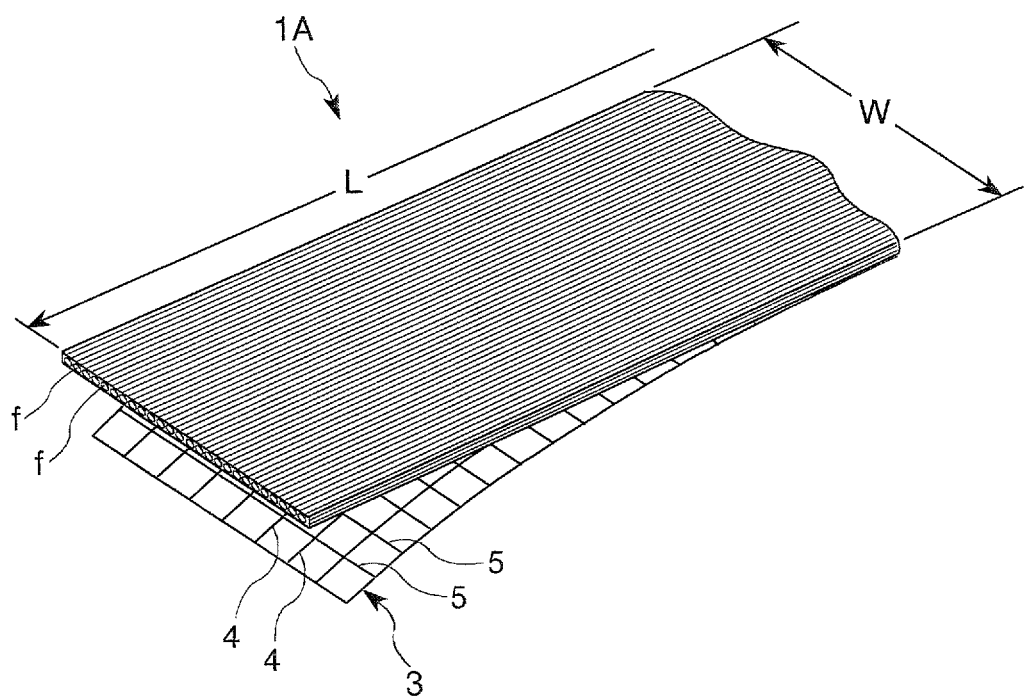
FIG. 2 illustrates an embodiment of a fiber sheet that can be used in the reinforcing method for a steel structure according to the present invention.

FIG. 2 shows an example of the fiber sheet 1 that can be used in the present invention. As the fiber sheet 1, there is used a fiber sheet 1A which is not impregnated with a resin and in which continuous reinforcing fibers f are arranged in one direction and configured in the form of a sheet.

More specifically, the fiber sheet 1A can be configured such that a reinforcing fiber sheet including the continuous reinforcing fibers f arranged in one direction is held by a strand fixing member 3 that is a mesh like support sheet or the like. For example, when carbon fibers are used as the reinforcing fibers f, for example, a plurality of resin-unimpregnated single fiber bundles obtained by bundling 6000 to 24000 single fibers (carbon fiber monofilaments) f each having an average diameter of 7 μm are used and arranged in one direction in parallel with each other. A fiber weight of the carbon fiber sheet 1A is usually set to 30 to 1000 g/m$^2$.

A thermoplastic resin of a low-melting-point type is impregnated in the surfaces of weft threads 4 and warp threads 5 configuring the mesh-like support sheet serving as the strand fixing member 3. The mesh-like support sheet 3 is laminated on one surface or both surfaces of carbon fibers arranged in the form of a sheet and heated and pressed to weld portions of the weft threads 4 and the warp threads 5 of the mesh-like support sheet 3 to the carbon-fiber sheet.

The mesh-like support sheet 3 is not limited to the two-axes configuration. The mesh-like support sheet 3 can also be formed by arranging glass fibers along three-axes or arranging glass fibers as only the warp threads 5 perpendicular to carbon fibers arranged in one direction, i.e., along one axis, and bonded to the sheet-like carbon fibers.

As a line of thread of the strand fixing member 3, for example, a compound fiber having a double structure having a glass fiber as a core thereof and a low-melting-point thermo-fusing polyester arranged around the glass fiber is also preferably used.

Concrete Example 2

Figure 3:
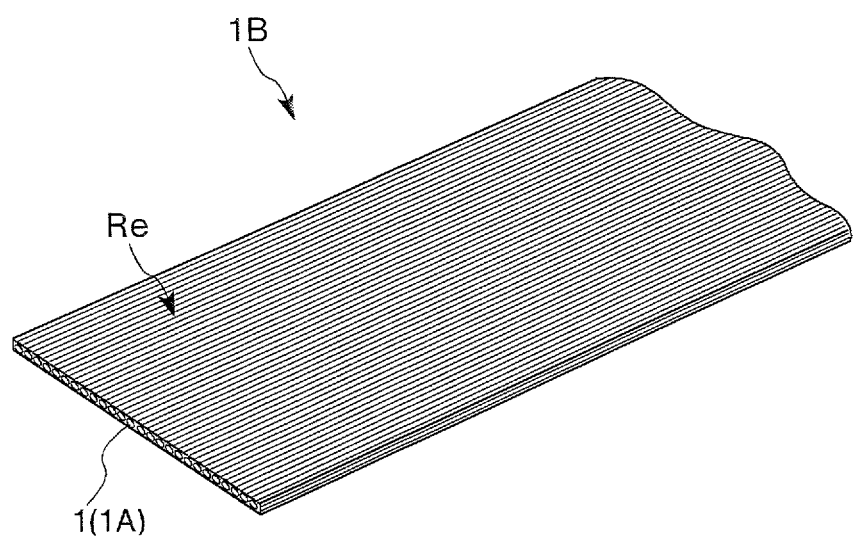
FIG. 3 illustrates another embodiment of the fiber sheet that can be used in the reinforcing method for a steel structure according to the present invention.

As the fiber sheet 1, as shown in FIG. 3, there can also be used a fiber sheet (so-called FRP plate) 1B obtained by impregnating a resin Re in a reinforcing fiber sheet in which the plurality of reinforcing fibers f are arranged in one direction, for example, the fiber sheet 1A as shown in FIG. 2 and hardening the resin.

In the fiber sheets 1A and 1B described in Concrete Examples 1 and 2 described above, as the reinforcing fibers f, not only carbon fibers but also glass fibers, basalt fibers; metal fibers such as boron fibers, titanium fibers, steel fibers; and, furthermore, organic fibers such as aramid fibers, PBO (Poly(p-phenylenebenzobisoxazole)) fibers, polyamide fibers, polyarylate fibers, and polyester fibers are singly used or used by mixture as hybrid fibers.

As the resin Re in the fiber sheet 1B according to Concrete Example 2, a thermosetting resin or a thermoplastic resin can be used. As the thermosetting resin, a room-temperature-setting or thermosetting epoxy resin, a vinylester resin, an MMA resin, an acrylic resin, an unsaturated polyester resin, a phenol resin, or the like is preferably used. As the thermoplastic resin, nylon, vinylon, or the like can be preferably used. An amount of impregnated resin is set to 30 to 70% by weight, more preferably, 40 to 60% by weight.

Concrete Example 3

Furthermore, as shown in FIGS. 4 and 5, as the fiber sheet 1, a fiber sheet 1C in which a plurality of continuous fiber-reinforced plastic strands 2 impregnated with a matrix resin R and hardened and each having a small diameter are arranged in the longitudinal direction in the form of a blind, and are fixed to each other with the strand fixing member 3 can also be used.

Figure 5A:
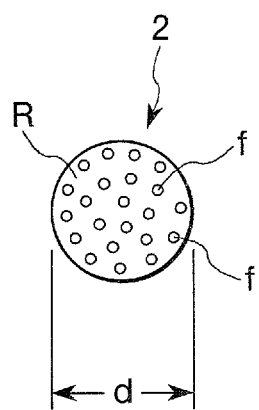
FIGS. 5(a) and (b) illustrate in section examples of a fiber-reinforced plastic strand configuring the fiber sheet that can be used in the reinforcing method for a steel structure according to the present invention.
Figure 5B:
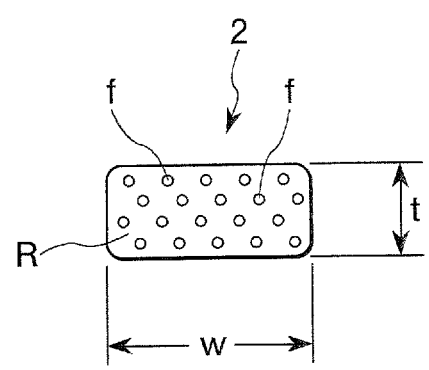

The fiber-reinforced plastic strands 2 can have an almost circular sectional shape (FIG. 5(a)) having a diameter (d) of 0.5 to 3 mm or an almost rectangular sectional shape (FIG. 5(b)) having a width (w) of 1 to 10 mm and a thickness (t) of 0.1 to 2 mm. As a matter of course, as needed, other various sectional shapes may be used.

As described above, in the fiber sheet 1 arranged in one direction in the form of a blind, the strands 2 are closely spaced apart from each other with gaps (g)=0.05 to 3.0 mm are fixed with the strand fixing member 3. A length (L) and a width (W) of the fiber sheet 1 formed as described above are arbitrarily determined depending on the dimensions and shape of a structure to be reinforced. However, in terms of handling, in general, an overall width (W) is set to 100 to 1000 mm. A strip-like sheet having a length (L) of about 1 to 5 m or a sheet having a length (L) of 100 m or more can be manufactured. However, the sheet is arbitrarily cut and used.

The fiber sheet 1C can also be manufactured such that the length (L) is set to about 1 to 5 m and the width W is set to about 1 to 10 m larger than the length (L).

Also in the fiber sheet 1C, as the reinforcing fibers f, carbon fibers, glass fibers, basalt fibers; metal fibers such as boron fibers, titanium fibers, and steel fibers; and, furthermore, organic fibers such as aramid fibers, PBO (Poly(p-phenylenebenzobisoxazole)) fibers, polyamide fibers, polyarylate fibers, and polyester fibers are singly used or used by mixture as hybrid fibers. As the matrix resin R impregnated in the fiber-reinforced plastic strand 2, a thermosetting resin or a thermoplastic resin can be used. As the thermosetting resin, a room-temperature-setting or thermosetting epoxy resin, a vinylester resin, an MMA resin, an acrylic resin, an unsaturated polyester resin, a phenol resin, or the like is preferably used. As the thermoplastic resin, nylon, vinylon, or the like can be preferably used. An amount of impregnated resin is set to 30 to 70% by weight, more preferably, 40 to 60% by weight.

As a method of fixing the strands 2 with the strand fixing member 3, as shown in FIG. 4, for example, there can be employed a method in which weft threads are used as the strand fixing member 3 and in which the weft threads are put into the strands in the form of a sheet-like shape configured by the plurality of strands 2 arranged in one direction in the form of a blind, i.e., a continuous strand sheet, at predetermined intervals (P) perpendicular to the strands so as to be woven. The intervals (P) for putting the weft threads 3 are not limited. However, the intervals are selected within a range of intervals usually from 10 to 100 mm in consideration of handling properties of the manufactured fiber sheet 1.

At this time, the weft threads 3 are a line of threads obtained by bundling a plurality of glass fibers or organic fibers each having, for example, a diameter of 2 to 50 μm. As the organic fibers, nylon, vinylon, or the like is preferably used.

Figures 6A, 6B:
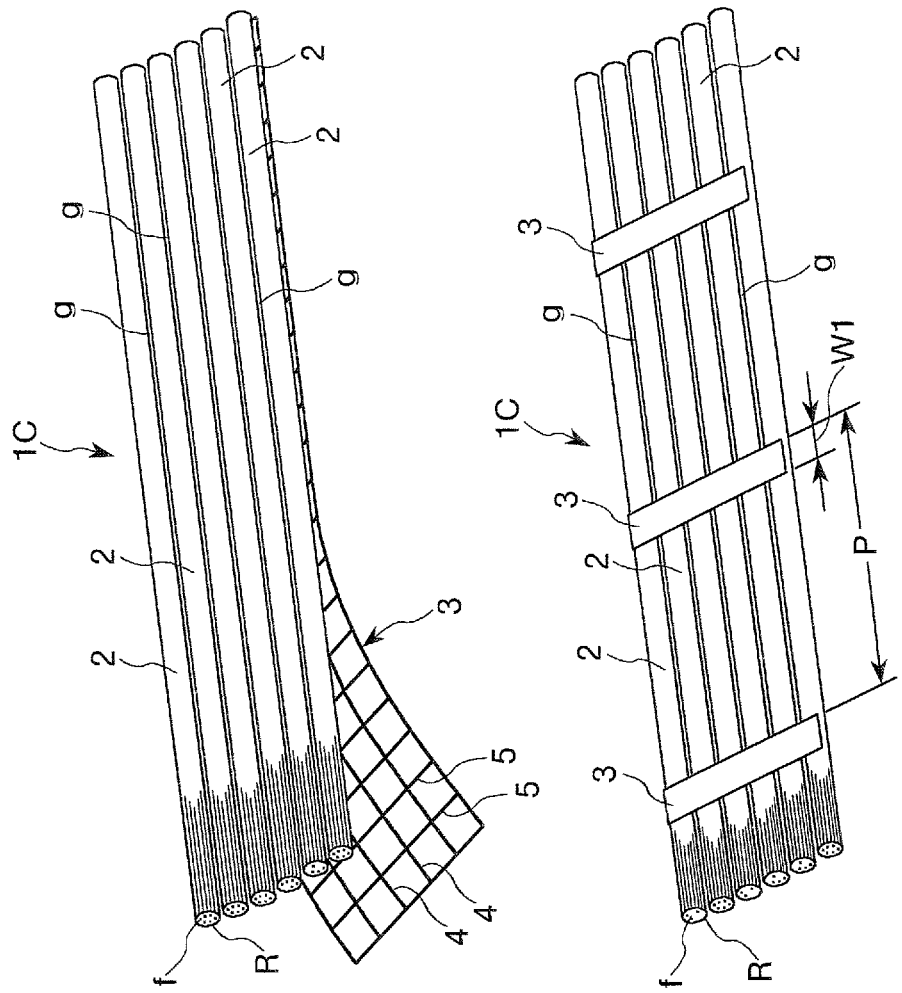
FIGS. 6(a) and (b) illustrate in section other embodiments of the fiber sheet that can be used in the reinforcing method for a steel structure according to the present invention.

As another method of fixing the strands 2 in the form of a blind, as shown in FIG. 6(a), a mesh-like support sheet can be used as the strand fixing member 3.

More specifically, a configuration in which one surface or both surfaces of the plurality of strands 2 arranged in the form of a blind and having a sheet-like shape, i.e., a strand sheet is supported with the mesh-like support sheet 3 that is manufactured with glass fibers or organic fibers each having a diameter of, for example, 2 to 50 μm and has the same configuration as described in Concrete Example 1 can be used.

Furthermore, as another method of fixing the strands 2 in the form of a blind, as shown in FIG. 6(b), as the strand fixing member 3, for example, a flexible belt-like member that is an adhesive tape, a sticky tape, or the like can be used. The flexible belt-like member 3 is attached to one surface or both the surfaces of the plurality of fiber-reinforced plastic strands 2 in a direction perpendicular to the longitudinal direction of each of the fiber-reinforced plastic strands 2 arranged in the form of a blind and having a sheet-like shape to fix the fiber-reinforced plastic strands 2.

More specifically, as the flexible belt-like member 3, an adhesive tape or a sticky tape such as a polyvinyl chloride tape, a paper tape, a cloth tape, or a nonwoven tape each having a width (w1) of about 2 to 30 mm is used. The tapes 3 are generally attached to the fiber-reinforced plastic strands 2 at intervals (P) of 10 to 100 mm in a direction perpendicular to the longitudinal direction of each of the fiber-reinforced plastic strands 2.

Furthermore, the flexible belt-like member 3 can also be achieved such that a thermoplastic resin such as nylon or an EVA resin is fused in the form of a belt on one surface or both the surfaces of the strands 2 in a direction perpendicular to the longitudinal direction of the strands 2.

(Reinforcing Method)

A reinforcing method for a steel structure will be described below with reference to FIG. 7. According to the present invention, a steel structure is reinforced by using the fiber sheet 1 manufactured as described above.

More specifically, according to the reinforcing method for a steel structure of the present invention, for example, as the fiber sheet 1, the fiber sheet 1A described in Concrete Example 1 and manufactured by arranging the reinforcing fibers f in one direction can be used. The fiber sheet 1A is caused to adhere onto the elastic layer 104 formed on the surface of the steel structure with the adhesive agent 105 to integrate the elastic layer 104 with the fiber sheet 1A. At this time, while the fiber sheet 1A is caused to adhere to the steel structure, impregnation of the fiber sheet 1A with an adhesive agent (matrix resin) can also be performed by the adhesive agent.

In this manner, there is formed a reinforcing structure 200 for a steel structure having the elastic layer 104 and the fiber sheet layer 106 on which the fiber sheet 1 is impregnated with a resin.

In reinforcement of the steel structure 100, the fiber sheet 1 is bonded to a member (structure) that mainly receives a bending moment and axial force such that an orientation direction of reinforcing fibers is almost matched with a main stress direction of tensile stress or compression stress generated by the bending moment, so that the fiber sheet 1 is effectively loaded with stress to make it possible to efficiently increase a load-carrying capacity of the structure.

When the bending moment acts in two orthogonal directions, the fiber sheets 1 of two or more layers are orthogonally laminated and caused to adhere to each other such that an orientation direction of the reinforcing fibers f of the fiber sheets 1 is almost matched with main stress generated by the bending moment to make it possible to efficiently increase a load-carrying capacity.

(First Step)

Figure 7A:
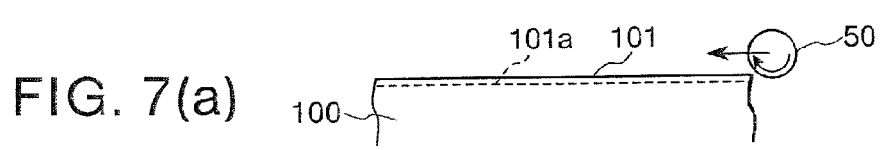
FIGS. 7(a) to (f) illustrate working steps for explaining an embodiment of the reinforcing method for a steel structure according to the present invention.
Figure 7B:
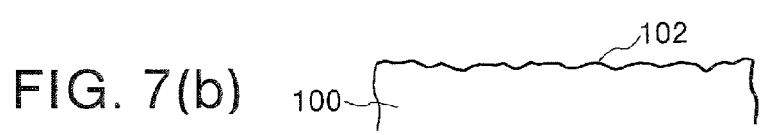

As shown in FIGS. 7(a) and 7(b), as needed, a weak portion 101a of a reinforced surface (i.e., a bonded surface) 101 of the steel structure 100 is removed with a polishing means 50 such as a disk sander, a sandblast, a steel shot blast, or a water jet to perform surface preparation on the adhesive surface 101 of the steel structure 100.

(Second Step)

Figure 7C:
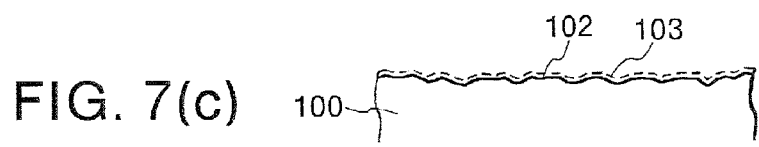

An epoxy modified urethane resin primer 103 is applied to the surface 102 subjected to surface preparation (FIG. 7(c)). As the primer 103 is not limited to epoxy modified urethane resins. An MMA resin or the like is arbitrary selected in accordance with the materials of the elastic layer 104 (FIG. 7(d)) and the reinforced steel structure 100.

The step of applying the primer 103 can also be omitted.

(Third Step)

Figure 7D:
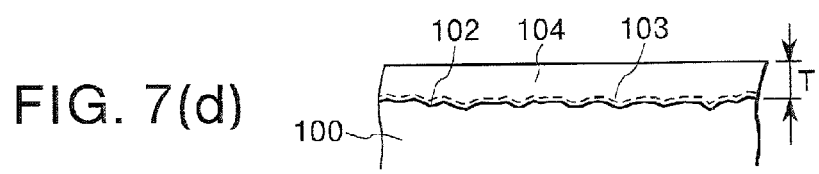

The polyurea resin putty 104 is applied to the surface 102 subjected to surface preparation to have a desired thickness (T) and hardened to form the elastic layer 104 (FIG. 7(d)). The application thickness (T) is arbitrarily set in accordance with an uneven surface of the bonded surface 102 and the thickness T of the fiber sheet 1. However, in general, T=about 0.2 to 10 mm is given.

In the present invention, the polyurea resin putty having a low elastic modulus, i.e., a material forming the elastic layer 104 (elastic layer forming material) contains a main resin, a hardening agent, a filler, an additive agent, and the like and has a composition. An example of the composition is as follows.

(i) The main resin: a prepolymer containing isocyanate (for example, 4, 4' diphenylmethane diisocyanate) as a reactive component and having residual terminal isocyanate the NCO weight percent of which is adjusted to 1 to 16 parts by weight is used.

(ii) The hardening agent: a hardening agent containing an aromatic amine (for example, amine equivalent of 80 to 90) as a main component is used, an equivalence ratio of NCO serving as a main resin to an amine being given by 1.0:0.55 to 0.99 parts by weight. Furthermore, the hardening agent can contain p-toluenesulfonate or the like as a hardening accelerator.

(iii) The filler: a filler contains silica powders, a thixotropic agent, and the like, the components being arbitrarily combined with each other at 1 to 500 parts by weight.

(iv) The additive agent: an additive agent contains a coloring agent, a viscosity modifier, an elasticizer, and the like, the components being arbitrarily combined with each other at 1 to 50 parts by weight. The polyurea resin putty has a tensile elongation of 400% or more after curing (in a normal state, 400 to 600%), a tensile strength of 8 N/mm$^2$ or more (in a normal state, 8 to 10 N/mm$^2$), and a tensile elastic modulus of 60 N/mm$^2$ or more and 500 N/mm$^2$ or less (in a normal state, 60 to 100 N/mm$^2$).

When the elastic modulus is less than 60 N/mm$^2$, necessary reinforcing stress cannot be transmitted. In contrast to this, when the elastic modulus exceeds 100 N/mm$^2$, especially, 500 N/mm$^2$, extensibility is disadvantageously short.

In order to use the polyurea resin as a putty, a viscosity obtained at a rotating speed of 2 by a BM viscometer is 200 to 700 Pa·s at 23° C., and falls within the range of 60 to 100 Pa·s at a rotating speed of 20. A thixotropic index, i.e., a ratio of measurement values of viscosities obtained at different rotating speeds by a rotational viscometer ((viscosity at a rotating speed of 20)/(viscosity at a rotating speed of 2)) is desirably 4 to 7.

More specifically, when the viscosity is smaller than 60 Pa·s and the thixotropic index is smaller than 4, sag down or the like occurs after the application to make smoothing of applied surfaces and application of a ceiling plane and a wall surface difficult. In contrast to this, when the viscosity is larger than 100 Pa·s and the thixotropic index exceeds 7, the resin is hard and poses a problem in mixing, and the resin cannot be easily smoothly applied.

In this case, the following Table 1 shows results obtained by comparing the physical properties of an epoxy resin putty conventionally used as a material forming a buffer layer described in Patent Document 1 and the polyurea resin putty having the above composition and serving as a material forming the elastic layer used in the present invention.

TABLE 1

| | Conventional technique | Present invention | Remarks |
| --- | --- | --- | --- |
| Tensile elongation of buffer layer | 100-200% | 423% | Considerably deviated |
| Tensile strength of buffer layer | 0.1-50 N/mm$^2$ | 8.04 N/mm$^2$ | Conformable |
| Tensile elastic modulus of buffer layer | 0.1-50 N/mm$^2$ | 61.3 N/mm$^2$ | Deviated |
| Amount of filler | 0 to 50% by mass | 33.1% by mass | Conformable |
| Application thickness regulation | 100-2000 μm | 1000 μm | Conformable |

TABLE 2

Relationship between temperature and tensile elastic modulus of buffer layer

| Test temperature | Conventional technique | Present invention |
| --- | --- | --- |
| −20° C. | 1600 N/mm$^2$ | 99.2 N/mm$^2$ |
| 0° C. | 1500 N/mm$^2$ | 85.1 N/mm$^2$ |
| 23° C. | 100 N/mm$^2$ | 61.3 N/mm$^2$ |
| 40° C. | 12 N/mm$^2$ | 61.0 N/mm$^2$ |
| 60° C. | 12 N/mm$^2$ | 61.0 N/mm$^2$ |

According to the results of Table 1 and the table (Table 2) of the relation between the temperature and the elastic modulus of the buffer layer, when the epoxy resin putty is used, elongation and toughness cannot be compatible. In particular, at a high temperature, the material strength of the epoxy resin is deteriorated to make it impossible to exert a steel reinforcing effect. In addition, at a low temperature in winter, the enlargement property is extremely deteriorated to hard the resin so as to cause early peeling.

In contrast to this, the polyurea resin putty used in the present invention can exert stable performance at a temperature of −20° C. to +70° C. Thus, the polyurea putty is used as an elastic layer forming material for reinforcing a steel structure and can achieve prevention of peeling and a repairing/reinforcing effect can be achieved regardless of a change in temperature. It is understood that the polyurea resin putty can be very preferably used in the method of reinforcing a steel structure.

(Fourth Step)

Figure 7E:
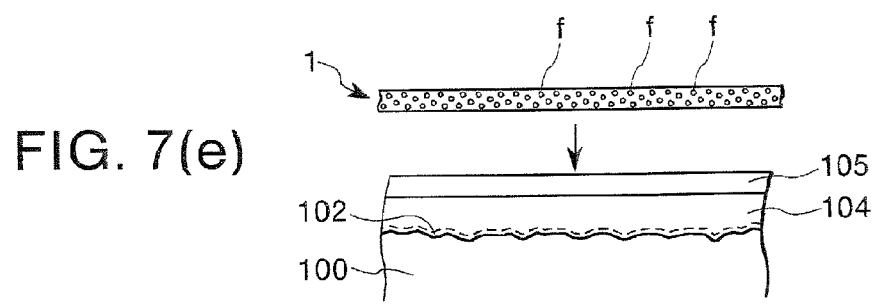
Figure 7F:
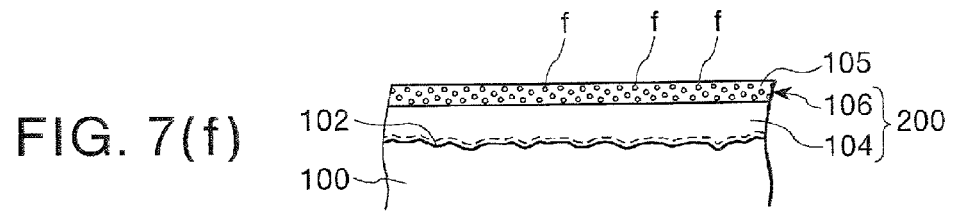

As shown in FIGS. 7(e) and 7(f), when the resin putty is hardened to form the elastic layer 104, the adhesive agent 105 is applied to the elastic layer 104. The fiber sheet 1 is pressed against the surface of the adhesive agent 105 to bond the fiber sheet 1 to the surface 102 of the steel structure 100 to be reinforced through the elastic layer 104.

As the adhesive agent 105, in order to apply the adhesive agent 105 at a high temperature, preferably, an adhesive agent having a glass transition temperature adjusted to 60° C. or more, normally, 70° C. to 100° C. is used. As described above, the steel structure 100, i.e., a steel product has a surface temperature that increases to about 60° C. by direct sunlight in summer in this country. For this reason, an adhesive agent used in reinforcement by a fiber sheet having a conventional specification softens at this temperature. It is understood that a necessary repairing/reinforcing effect cannot be obtained in some cases.

Thus, when an adhesive agent having a glass transition temperature of, preferably 60° C. or more, normally, 70° C. to 100° C. is used as the adhesive agent 105, a reinforcing effect can be prevented from being eliminated by direct sunlight, and a sufficient reinforcing effect can be obtained. In addition, the fiber sheet can be prevented from being peeled away from the steel structure surface before the fiber sheet is broken.

As an adhesive agent having the above characteristics, a room-temperature-setting epoxy resin, an epoxy acrylate resin, an acrylic resin, an MMA resin, a vinylester resin, an unsaturated polyester resin, or a UV curable resin is given. More specifically, the room-temperature-setting epoxy resin and the MMA resin are preferably used.

In the embodiment, an epoxy resin adhesive agent is used. The epoxy resin adhesive agent is provided as two components including a main resin and a hardening agent. An example of the composition of the epoxy resin adhesive agent is as follows.

(i) The main agent: a main resin containing an epoxy resin as a main component and a silane coupling agent serving as an adhesion enhancing agent as needed is used. As the epoxy resin, for example, a bisphenol epoxy resin, in particular, a rubber modified epoxy resin to give toughness can be used. Furthermore, a reactive diluent and a thixotropic agent may be added as usage.

(ii) The hardening agent: a hardening agent contains amines as main components, a hardening accelerator as needed, a coloring agent, and the like is used as an additive agent. An equivalence ratio of an epoxy resin serving as the main resin to amines of the hardening agent is 1:1. As the amines, for example, an aliphatic amine containing metaxylenediamine and isophoronediamine can be used. The epoxy resin having the above composition has a glass transition temperature of 70° C. or more (74° C.).

In the above description, the adhesive agent 105 is applied onto the elastic layer 104. However, as a matter of course, the adhesive agent 105 can also be applied to the fiber sheet 1 or may be applied onto both of the surface of the elastic layer 104 and the bonded surface of the fiber sheet 1.

When quantity of reinforcement is large, a plurality of fiber sheets 1 can be bonded to adhere to the surface of the structure. However, when the plurality of fiber sheets 1 are laminated and bonded to adhere to each other, stress may be concentrated on an end portion, and resistance to peeling/breaking may be lowered.

Thus, in order to prevent the sheet from being peeled and broken, as shown in FIG. 8, sheet lengths (L) (see FIG. 1) of the fiber sheets 1 of the respective layers are preferably changed. For example, the lengths of the fiber sheets 1 laminated as a plurality of layers are gradually decreased toward an outer layer spaced apart from the structure surface 102, and end portions 1a of the fiber sheets 1 are stepwise laminated. Shift lengths (h) of the sheet end portions 1a are properly set to about 30 mm to 300 mm. For example, the sheets 1 are bonded to each other to gradually decrease the lengths of the sheet end portions 1a by 100 mm each to make it possible to obtain a preferable effect.

More specifically, the end portions 1a are stepwise laminated such that the lengths (L) of the fiber sheets 1 laminated as a plurality of layers are gradually reduced toward the outer layer by about 30 to 300 mm to make it possible to reduce stress concentration on the sheet end portions 1a and to improve the resistance to peeling.

The following experiments were executed to prove the operational advantages of the reinforcing method and the reinforcing structure of a structure and an elastic layer forming material for reinforcing a steel structure according to the present invention.

Experimental Example 1

In this experimental example, the fiber sheet 1 was used to reinforce a steel plate serving as the steel structure 100 according to an adhesion method. The fiber sheet 1 used in the experimental example was the fiber sheet 1A having the configuration described as Concrete Example 1 with reference to FIG. 2.

As the reinforcing fibers f in the fiber sheet 1A, resin-unimprgnated pitch-based carbon fiber strands including 6000 fibers as bundled, each having an average diameter of 10 μm were arranged in one direction in the form of a sheet such that a fiber weight is 300 g/m$^2$. The 2-axis mesh-like support member 3 manufactured by using glass fibers was adhered on one surface of the sheet-like reinforcing fibers to form the fiber sheet 1A.

The fiber sheet 1 serving as the fiber sheet 1A manufactured as described above had a width (W) of 500 mm and a length (L) of 50 m. In the embodiment, the fiber sheet is arbitrarily cut and used.

As described below, the steel plate 100 serving as a steel structure was reinforced by the same fiber sheet adhering method as described above with reference to FIG. 7 by using the fiber sheet 1. In the experiment, it is assumed that the fiber sheet 1 is attached to the lower surface of the steel plate 100.

In the experimental example, the lower surface of the steel product 100 was ground and cleaned by shotblasting to obtain a rough surface. An epoxy modified urethane primer ("FORCAUL-1" (tradename) available from Nippon Steel Materials CO., LTD.) 103 was applied to the surface 102 of the steel plate 100 at 0.15 kg/m².

After the epoxy modified urethane resin primer 103 was dried to the touch, in order to form the elastic layer 104 in the situation where the applied surface is a overhung surface, the polyurea resin putty having the composition described above was applied to the steel plate (specimen) 100 with a knife to have a thickness (T) of 1 mm. At this time, the polyurea resin putty kept adhering to the steel plate specimen 100 without dropping with its own weight after the completion of the application.

A viscosity of the putty-like polyurea resin used as the forming resin of the elastic layer 104 obtained at 23° C. and a rotating speed of 2 by a BM viscometer was 600 Pa·s, and a viscosity at a rotating speed of 20 was 95 Pa·s.

A thixotropic index ((viscosity at a rotating speed of 20)/(viscosity at a rotating speed of 2)) was 6.32.

The polyurea resin putty applied to the steel product surface 102 was hardened to form the elastic layer 104. The epoxy resin having a glass transition temperature of 74° C. and the composition described above was applied to the elastic layer 104 at an application quantity of 0.4 kg/m² (as a base coat on each layer when the plurality of fiber sheets 1 are laminated). After the fiber sheet 1 was lightly pressed against the epoxy-resin-applied surface, a plastic roller having a width of 100 mm and a diameter of 10 mm was moved on the fiber sheet 1 while being applied with a pressure force of about 100 N. As the fiber sheets, a total of 7 fiber sheets each having the configuration described above were laminated with an adhesive agent. More specifically, 5 "carbon fiber sheets C830" (tradename) available from Nippon Steel Materials CO., LTD. and 2 "carbon fiber sheets C160 (tradename) available from Nippon Steel Materials Co., LTD. were laminated.

The fiber sheet 1 was pressed from the upper surface of the sheet 1 by rolling a plastic roller, so that the epoxy resin was oozed from the gaps between the fibers of the fiber sheet 1. The fiber sheet was attached to the steel plate 100 without being held by some means, and was not peeled away from the steel plate 100.

As in the example, when the plurality of fiber sheets 1 were laminated, the epoxy resin 105 was applied to the surface of each of the fiber sheets 1 as a coating at an application quantity of 0.2 kg/m², and the surface was flatly finished with a rubber knife Thereafter, the resultant structure was cured at room temperature for one week. The fiber sheet 1 could be very preferably bonded to the steel plate 100 without generating voids in the attaching surface of the fiber sheet 1.

Figure 9:
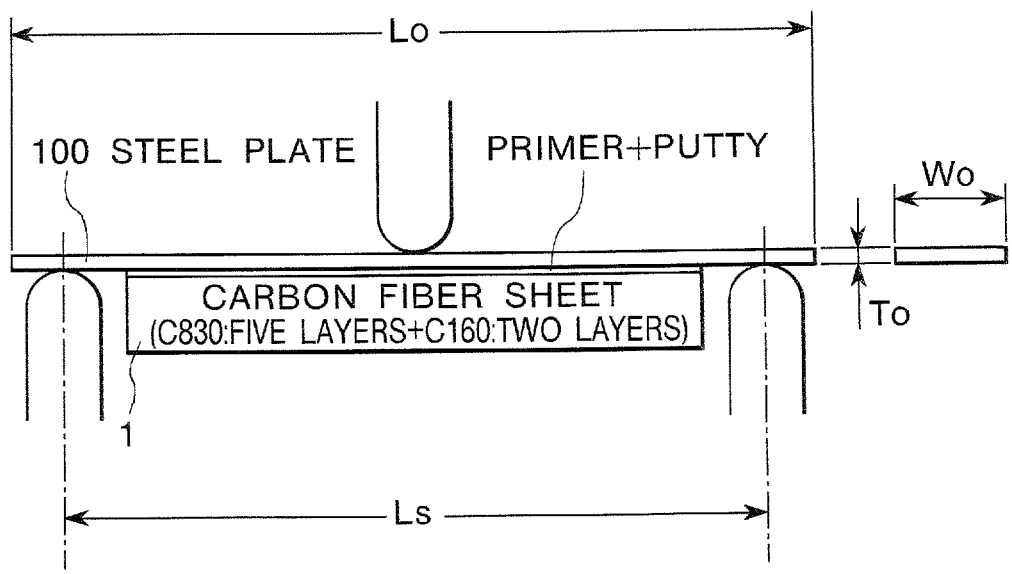
FIG. 9 illustrates a configuration of a bending strength test apparatus to verify the reinforcing method for a steel structure according to the present invention.

The fiber sheet reinforcing steel plate (present invention) 100 manufactured as described above and the fiber sheet reinforcing steel plates 100 using an epoxy-resin-impregnated adhesive agent having a glass transition temperature of 48° C. serving as an adhesive agent and a polyurethane resin putty (Comparative Example 1) and a soft epoxy resin putty (Comparative Example 2) as putty were subjected to a three-point bending test at an inter-fulcrum distance Ls of 80 mm by using a test apparatus shown in FIG. 9. The cross section of each of the steel plates 100 has a width W0=25 mm, a thickness T0=2.0 mm, and a total length L0=100 mm. Three specimens, as described above, were manufactured with the same structures and the same materials expect that the adhesive agent 105 and the putty 104 with which the fiber sheets were caused to adhere to the steel plate surfaces.

Constituent materials of the present invention and Comparative Examples 1 and 2 in the experiment are summarized to obtain the following Table 3.

TABLE 3

| | Putty | Impregnated adhesive agent | Continuous fiber sheet material |
|---|---|---|---|
| Present Invention | Polyurea resin putty | Tg 74° C. epoxy | C830 × 5 layers + C160 × 2 layers |
| Comparative Example 1 | Polyurethane resin putty | Tg 48° C. epoxy | C830 × 5 layers + C160 × 2 layers |
| Comparative Example 2 | Soft epoxy resin putty | Tg 48° C. epoxy | C830 × 5 layers + C160 × 2 layers |

Figure 10:
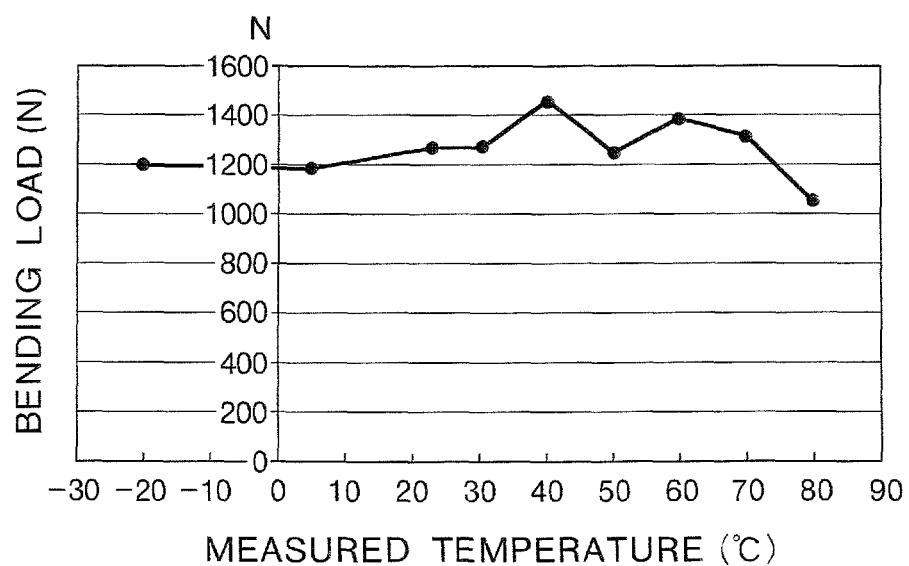
FIG. 10 is a graph showing a bending test result of a steel structure reinforced according to the present invention.
Figure 11:
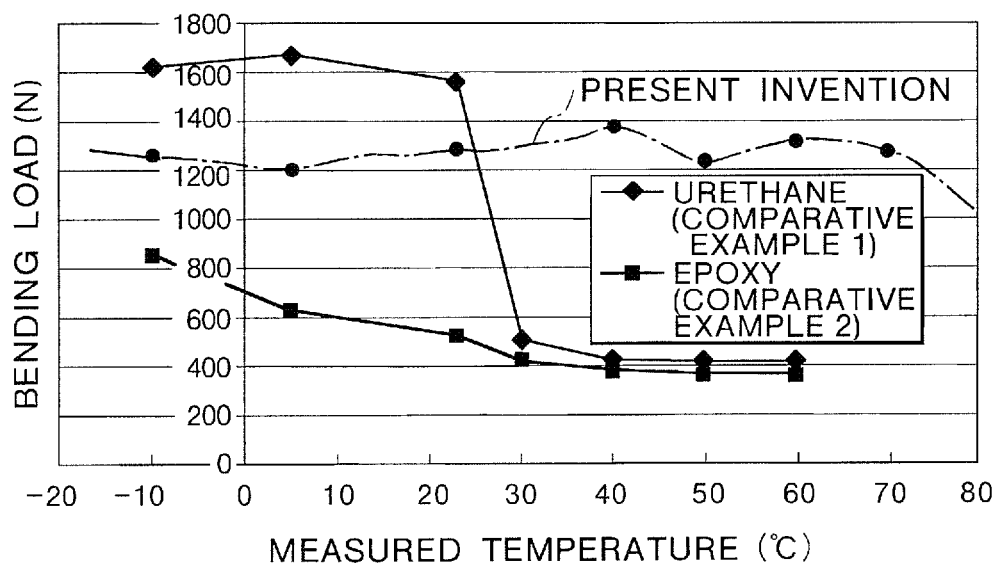
FIG. 11 is a graph showing a bending test result of a reinforced steel structure to compare the present invention with comparative examples.

Results of the bending test are shown in FIGS. 10 and 11. According to a bending test graph shown in FIG. 11 in which a temperature and a load change, the following points are noted.

More specifically, in the specification of Comparative Example 1, a decrease in load occurred at about 30° C., and the epoxy-resin-impregnated adhesive agent was softened. On the other hand, by using the property of the epoxy resin hardened at a low temperature, a high load is exhibited at a low temperature. In this situation, the repairing and reinforcing capabilities cannot be satisfied at a high temperature under the climate condition in Japan.

In the specification of the Comparative Example 2, when the temperature is low, the soft epoxy resin putty was hardened due to the temperature, and the epoxy resin putty was early peeled before the load increased. This shows that the reinforcement cannot be attained. At a high temperature, the soft epoxy resin putty was peeled due to an early material failure of the soft epoxy resin putty.

In contrast to this, it was confirmed that the polyurea resin putty according to the present invention exhibited stable performance at from a low temperature to a high temperature, and that the repairing/reinforcing material and the working process specification which conform to the climate condition in Japan were established.

Experimental Example 2

In the experimental example, by using the same fiber sheet 1 as described in Experimental Example 1, a steel plate serving as the steel structure 100 was reinforced according to the adhesion method.

More specifically, as the fiber sheet reinforcing steel plate (the present invention) 100 according to the present invention, the fiber sheet 1 manufactured as described above was attached to the steel plate 100, as in Experiment 1, by using a urethane modified epoxy resin primer serving as the primer 103, the polyurea resin putty having the above composition and serving as a putty for the elastic layer 104, and the epoxy resin having a glass transition temperature of 74° C. and the composition described above and serving as the adhesive agent 105.

In Comparative Example 3, the fiber sheet 1 manufactured as described above was attached to the steel plate 100 by using the epoxy resin primer serving as the primer 103 and the epoxy resin having a glass transition temperature of 74° C. and the composition described above and serving as the adhesive agent 105 without using a putty for the elastic layer 104.

In Comparative Example 4, the fiber sheet 1 manufactured as described above was attached, as in Experiment 1, to the steel plate 100 by using an epoxy modified urethane resin primer serving as the primer 103, a polyurea resin putty serving as a putty for the elastic layer 104, and an epoxy resin ("FR-E3P" (tradename) available from Nippon Steel Materials Co., LTD.) having a glass transition temperature of 48° C. and serving as an adhesive agent.

By using the three specimens manufactured as described above, the same bending test as that in Experimental Example 1 was executed. Test results are shown in Table 4 and FIG. 12.

TABLE 4

| Temperature (° C.) | Present Invention Polyurea resin putty + high-Tg epoxy (74° C.) | Comparative Example 3 High-Tg epoxy No putty | Unit (N) Comparative Example 4 Polyurea resin putty + low-Tg epoxy (48° C.) |
| --- | --- | --- | --- |
| −20 | 1200 | 1206 | 1268 |
| 5 | 1184 | 1272 | 1203 |
| 23 | 1278 | 1269 | 1211 |
| 30 | 1270 | 1136 | 1176 |
| 40 | 1454 | 1243 | 1134 |
| 50 | 1249 | 1050 | 825 |
| 60 | 1392 | 900 | 644 |

Figure 12:
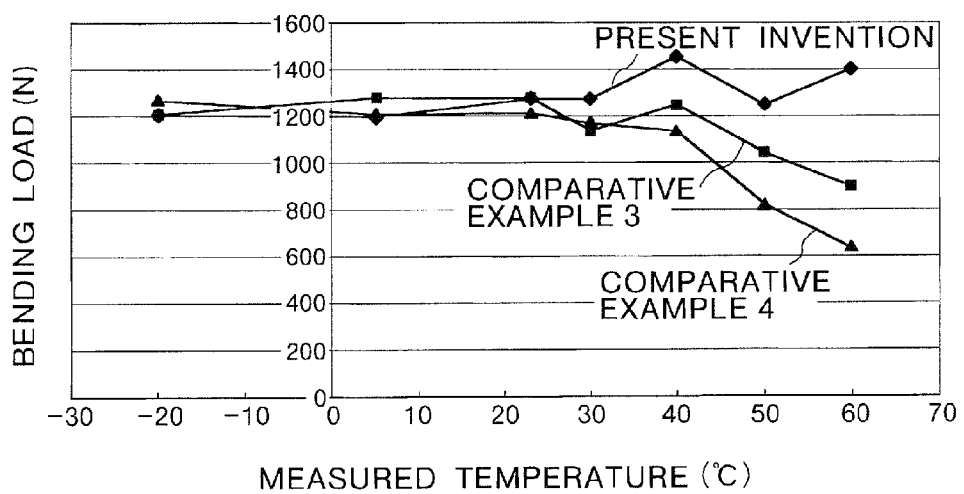
FIG. 12 is a graph showing a bending test result of a reinforced steel structure to compare the present invention with comparative examples.

According to a bending test graph shown in FIG. 12 in which a temperature and a load change, the following points are understood.

In Comparative Example 3, as in the present invention, although the high-Tg epoxy resin adhesive agent having a glass transition temperature of 74° C. is used, the fiber sheet 1 is attached to the steel plate 100 without using a polyurea resin putty. Thus, in comparison with the present invention, in Comparative Example 3, the effect of the polyurea resin putty (elastic layer 104) can not been obtained, so that sufficient reinforcement of the steel plate cannot be achieved with an increase in temperature. Also in Comparative Example 3, the epoxy resin adhesive agent was finally peeled as in Comparative Example 2.

In Comparative Example 4, the polyurea resin putty was used as in the present invention, a relatively-low-Tg epoxy resin adhesive agent having a glass transition temperature of 48° C. was used as an adhesive agent. As also in the case, although peeling of the fiber sheet layer 106 can be prevented due to the effect of the polyurea resin putty (elastic layer 104) as in the present invention, a bending load moderately decreases from about a glass transition temperature of 48° C. In comparison with the present invention, reinforcement itself was not sufficiently achieved at a high temperature. More specifically, Comparative Example 4 shows a situation in which the fiber sheet layer 106 using carbon fibers are bent together with the steel plate. Thus, even at a high temperature, in order to obtain a reinforcing effect, the glass transition point of the adhesive agent must be adjusted, and the glass transition point of the adhesive agent must be set to 60° C. or more, preferably, 70° C. or more for temperature control required for the climate condition.

In this manner, according to the reinforcing method and a reinforcing structure for a steel structure and the elastic layer forming material for reinforcing a steel structure of the present invention, it was proved that the steel structure 100 could be effectively reinforced.

REFERENCE NUMERALS

1 Fiber sheet
2 Fiber-reinforced plastic strand
3 Strand fixing member (weft threads, mesh support sheet, and flexible belt-like member)
100 Steel structure
103 Primer
104 Elastic layer
105 Adhesive agent
106 Fiber sheet layer
200 Reinforcing structure

The invention claimed is:

1. A reinforced steel structure comprising:
   (a) an elastic layer formed by applying a polyurea resin putty on a surface of the steel structure, the elastic layer having a tensile elongation of 400% or more in hardening, a tensile strength of 8 N/mm$^2$ or more, and a tensile elasticity modulus of 60 N/mm$^2$ or more and 500 N/mm$^2$ or less; and
   (b) a fiber sheet layer bonded to the surface of the steel structure having the elastic layer formed thereon with an adhesive agent and impregnated with a resin.

2. The reinforced steel structure according to claim 1, wherein the adhesive agent has a glass transition temperature that is adjusted such that a reinforcing effect can also be maintained even at a high temperature.

3. The reinforced steel structure according to claim 1, wherein the adhesive agent has a glass transition temperature of 60° C. or more.

4. The reinforced steel structure according to claim 1, wherein the adhesive agent is a room-temperature-setting epoxy resin, an epoxy acrylate resin, an acrylic resin, an MMA resin, a vinylester resin, an unsaturated polyester resin, or a UV curable resin.

* * * * *